United States Patent [19]

Morillon

[11] Patent Number: 4,538,505
[45] Date of Patent: Sep. 3, 1985

[54] EXTRACTING SCREW APPARATUS
[75] Inventor: Théodore Morillon, Andreze, France
[73] Assignee: Etablissements Morillon, Beaupreau, France
[21] Appl. No.: 471,037
[22] Filed: Mar. 1, 1983
[30] Foreign Application Priority Data Mar. 2, 1982 [FR] France .................. 82 03655

[51] Int. Cl.[3] ............................................. F15B 11/02
[52] U.S. Cl. ....................................... 91/518; 91/519; 91/534; 60/425
[58] Field of Search ................ 91/508, 509, 512, 513, 91/517, 518, 519, 533, 534; 60/425, 426, 484, 435, 441

[56] References Cited
U.S. PATENT DOCUMENTS 2,961,015 11/1960 Randall .................................. 91/534
4,226,166 10/1980 Frank ..................................... 91/509

Primary Examiner—Charles T. Jordan
Assistant Examiner—Richard Klein
Attorney, Agent, or Firm—Frost & Jacobs

[57] ABSTRACT

An extracting screw apparatus comprises a hydraulic control which operates during starting of the extracting screw after a period of nonuse. The hydraulic control comprises a double-acting hydraulic actuator having a piston rod connected to an intermittent drive such as an overrunning clutch for rotating a driving shaft for the extracting screw about its axis. The intermittent drive converts linear reciprocating movement transmitted by the hydraulic actuator into intermittent angular movement. A hydraulic motor alone insures rotation of the extracting screw about its axis after starting and also insures the sweep movement of the extracting screw about a vertical axis. A hydraulic control circuit connected between a line running from a pump to the hydraulic motor for cutting off hydraulic fluid to the double-acting hydraulic actuator after normal operating torque is reached.

3 Claims, 3 Drawing Figures

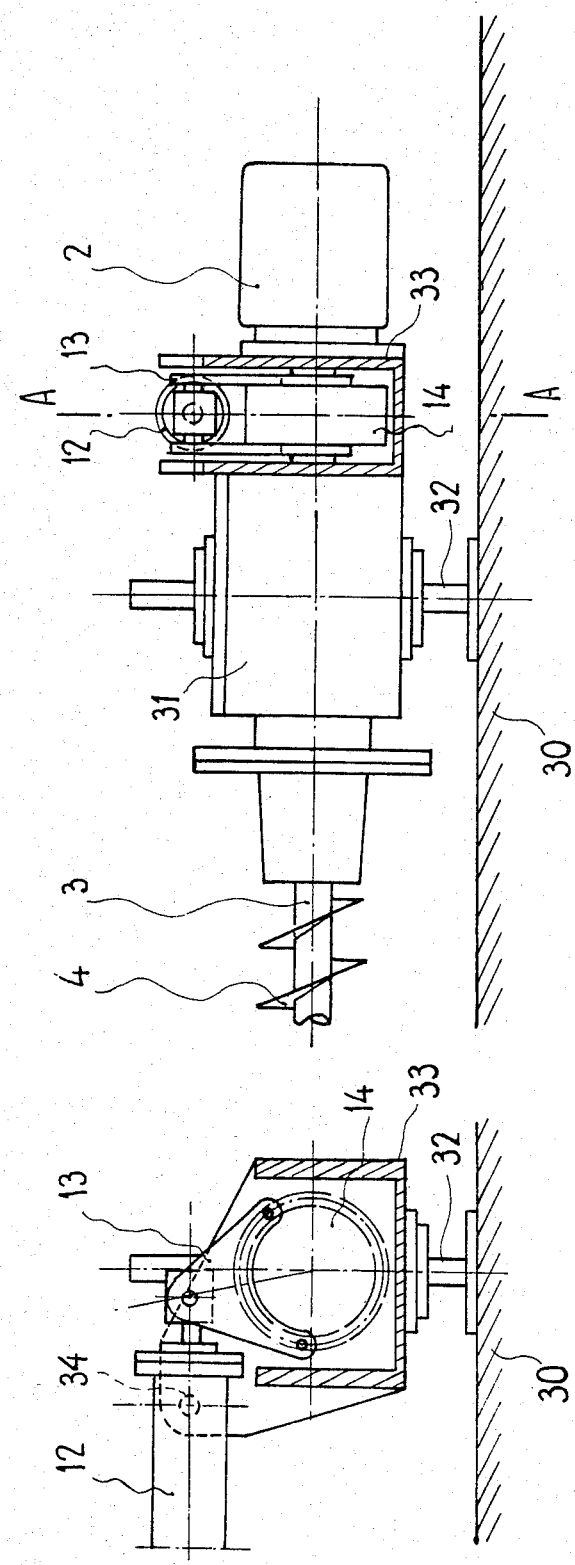

EXTRACTING SCREW APPARATUS

BACKGROUND OF THE INVENTION

The present invention relates to extracting screw apparatus for storage units for storing pulverulent and granular materials.

Extracting apparatus currently used for flat bottom storage units such as silos generally comprise an Archimede conveyor screw: which rotates about a horizontal axis and slowly sweeps continuously or intermittently about a vertical axis passing through the center of the silo. Two movements imparted to the screw are produced by one or more electric motors mechanically connected thereto. Such apparatus are generally oversized owing to the considerable forces to which they are subjected. In particular the very slow speed sweep movement of the screw can only be obtained by a torque motor associated with a high ratio reduction gear. After stopping the screw in the mass of the bulk material for a period of time a high starting torque is required in order to overcome the elevated mechanical resistance of the moving parts.

To overcome these drawbacks the assignee of the present application devised an apparatus disclosed in French patent application No 80 06 790 which insures the starting of the extracting screw in the mass of the bulk material with a power requirement equal to one half of that ordinarily needed, by reducing the number of transmission components to the extent possible and using for the sweep movement of the extracting screw, part of the left-over power of the motor for rotationally driving the extracting screw about its axis. This apparatus comprises a hydraulic motor coupled directly to the extracting screw and supplied by a main electro-hydraulic unit through an electrically controlled distributor valve so that outside the operating periods of the motor the hydraulic fluid is returned to a storage tank, the remaining energy from the motor being divided between the return line back to the main electro-hydraulic unit and a supply line for a double-acting hydraulic cylinder which produces the sequential sweep angular movement of the extracting screw about the vertical axis of the associated silo.

This apparatus comprises in the supply line for the double-acting hydraulic cylinder downstream of the hydraulic motor, means for adjusting the flow rate and the pressure as well as in the return line from the hydraulic cylinder in order to control the return speed of the piston in the hydraulic cylinder.

Measurements carried out on existing equipment show that the torque required for starting the movement of the screw was about twenty times more than the torque required for normal operation during extraction. The change of the torque from the starting phase to the normal operating phase generally requires the first two revolutions. To obtain the starting torque the hydraulic motor can be oversized along with the pump and the electric drive motor. Alternatively the hydraulic motor may be oversized, together with a pump having two delivery rates. This procedure then comprises starting at high pressure and low flow rate therefore at low speed, the pump operating at low pressure and low speed after movement begins. This procedure has the advantage of requiring a less powerful motor and accessories; nevertheless, the ratio between the normal operating torque and the maximum torque obtained by such a procedure is only one to four or five, whereby the starting torque has proved to be insufficient in certain cases.

SUMMARY OF THE INVENTION

An object of the invention is to improve the starting of the extracting screw in the very mass of a bulk material by developing a high rotational torque about the axis of the screw at relatively low pressure, thereby permitting the rated power to be reduced, the entire apparatus thus remaining economical and reliable and rational in use.

According to the invention there is provided an extracting screw apparatus having hydraulic control means comprising a double-acting hydraulic actuator having a piston rod connected to an intermittent drive means such as an overrunning clutch or a ratched drive fixed for rotation with a driving shaft for rotating the extracting screw about its axis. The drive shaft is also coupled to a hydraulic motor. The intermittent drive means converts linear reciprocating movement transmitted by the hydraulic actuator into intermittent angular movement. Each stroke of the hydraulic actuator produces an angular rotation of n degrees of the extracting screw about its axis.

The hydraulic actuator is supplied, on starting, by the hydraulic pump following the increase of pressure in the hydraulic lines connecting the pump to the hydraulic actuator motor for rotationally driving the extracting screw about its axis, the increase of pressure due to the increase of the load moment opposing the starting of the extracting screw in the mass of the bulk material. The supply of the hydraulic actuator is controlled by at least one calibrated control valve provided in the supply lines, the valve delivering the hydraulic fluid through a distributor valve controlling the reciprocating movement of the hydraulic actuator, the action of which immediately reduces the value of the load moment and thereupon the hydraulic pressure of the hydraulic circuit. Once the normal operating torque is obtained, the hydraulic actuator stops working, whereupon, the rotation of the extracting screw about its axis is produced by the hydraulic motor alone. The apparatus is equipped with accessories providing the control of the speed of the hydraulic actuator and the maximum operating pressure.

The accompanying drawings illustrate, by way of example, a preferred embodiment of the apparatus according to the invention.

BRIEF DESCRIPTION OF THE DRAWINGS

FIG. 2 is a fragmentary elevational view, partly in section, of the intermittent rotational drive means for the extracting screw about its axis, of the screw extracting apparatus.

FIG. 3 is a cross-sectional view taken along line A—A of FIG. 2.

DESCRIPTION OF THE PREFERRED EMBODIMENT

Figure 1:
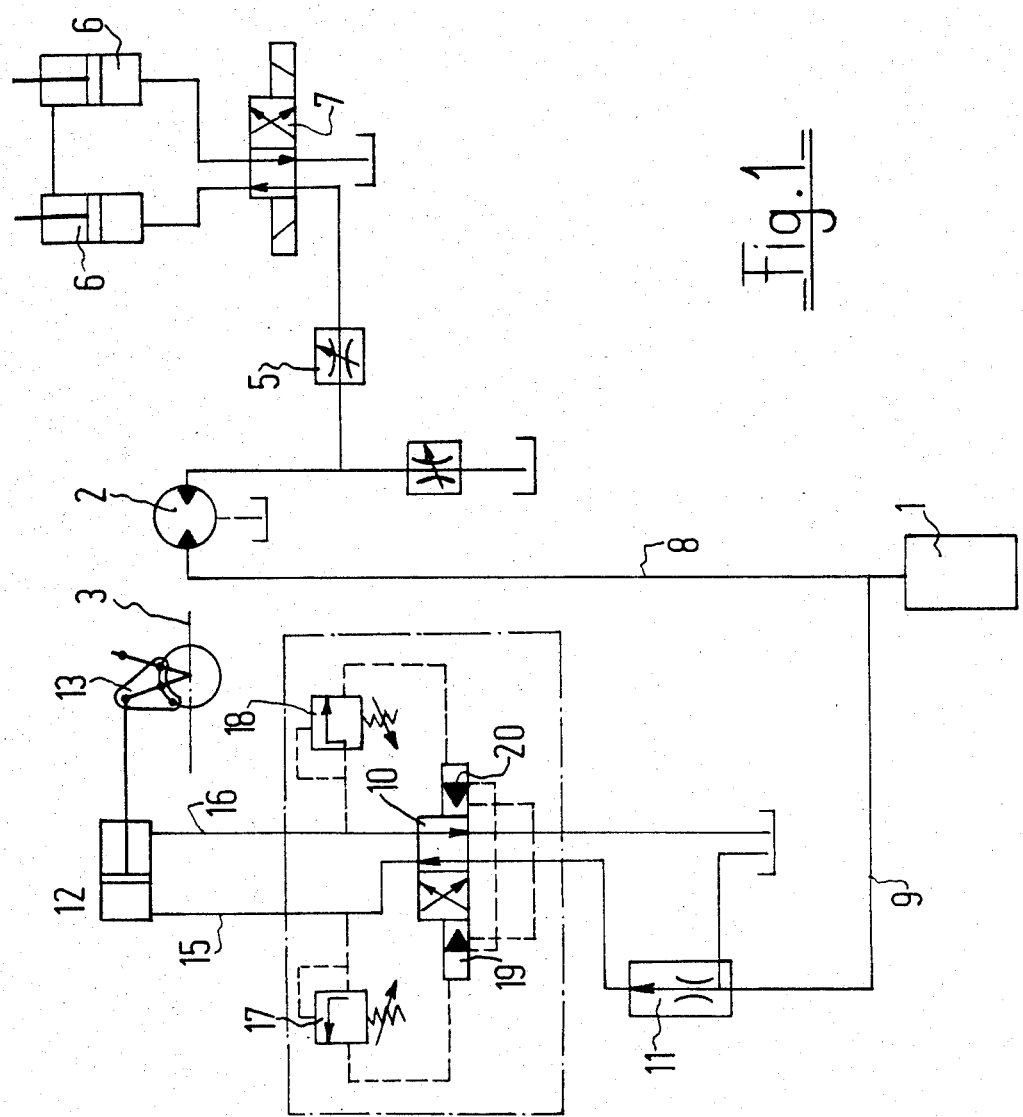
FIG. 1 is a hydraulic circuit diagram of the screw extracting apparatus having novel starting means.

FIGS. 2 and 3 show an extracting device associated with a silo, the bottom of which is generally indicated by reference numeral 30. A casing 31 is rotatively mounted on a vertical axle 32 supported by the silo bottom 30. Mounted on the casing 31 is shaft 3 carrying horizontal extracting screw 4. Casing 31 is also securely attached to hydraulic motor 2 which is coupled to shaft 3 in the usual conventional manner. A U-shaped support 33 carries a hydraulic actuator 12 through a pivot 34, the purpose of which will be explained herebelow.

As illustrated in FIG. 1, the hydraulic equipment for rotatably driving the extracting screw about its axis comprises a hydraulic circuit supplying the means for rotatably driving the extracting screw about its axis and the means for producing sweep movement of the extracting screw about the vertical axis of the associated silo or other storage unit for pulverulent or granular material.

Thus the pump 1 delivers hydraulic fluid to a hydraulic motor 2 coupled to driving shaft 3 carrying at one end an extracting screw 4. The rest of the output of the hydraulic motor 2 supplies a group of double-acting hydraulic actuators 6 through flow regulating means 5 and a mechanically controlled distributor valve 7 linked to the piston rods of the actuators 6. Actuators 6 produce a sequential sweep movement of the extracting screw above the bottom of the silo.

Along the supply line 8 to the hydraulic motor 2 is connected a novel hydraulic control circuit for starting the apparatus. The accumulation of the bulk material in the silo around the extracting screw during periods of non use increases the starting inertia of the apparatus. When starting up the apparatus there is an increase of the pressure in line 8 and therefore in the entire hydraulic control circuit for starting the apparatus which comprises a fluid intake 9 to a hydraulically controlled distributor valve 10, the flow rate upstream thereof being adjusted by means of a flow divider 11. The distributor valve 10 is in communication with the interior of the double-acting actuator 12 on both sides of the piston thereof, which piston is connected to a yoke member 13 having arms coacting with a ratchet drive or an overrunning clutch 14 fixed for rotation on the driving shaft 3 for carrying the extracting screw 4.

Each section of the line 15 or 16 supplying the hydraulic actuator 12 has an adjustable pressure relief valve 17,18 which in case of overpressure brings one of the sections into communication with calibrated check valves 19 and 20 associated with the distributor valve 10. The distributor valve 10 is thus controlled to alternately deliver the fluid to one side or the other of the piston of hydraulic actuator 12. The linear reciprocating movements of the hydraulic actuator 12 impart, by means of the ratchet drive or overrunning clutch 14, an intermittent angular movement to the extracting screw about its axis. The angular movement of the screw in the mass of the bulk material immediately causes a drop in the load moment and a reduction of the hydraulic pressure in the hydraulic control circuit.

Once the working pressure corresponding to the normal operating torque is reached, the relief valves 17, 18 are no longer operational due to the reduced working pressure, and thus the actuator 12 stops its reciprocating movement and remains in one of its external positions. The rotation of the extracting screw about its axis is thereupon insured by the hydraulic motor 2 supplied by pump 1. The operating period of hydraulic actuator 12 practically does not exceed two revolutions of the screw.

The invention is not intended to be limited to the particularly illustrated embodiment, but covers all possible modifications and alternatives understood to those skilled in the art without departing from the spirit and scope of the appended claims.

The apparatus according to the invention may be used for starting all hydraulically controlled screw extracting apparatus for pulverulent or granular materials kept in storage facilities such as bins and silos.

I claim:

1. A hydraulically controlled screw extracting apparatus for a flat bottom storage unit for bulk materials, said screw extracting apparatus comprising an extracting screw rotatable about its axis and connected to a driving shaft, a hydraulic system including an hydraulic motor, means for supplying a fluid under pressure to said hydraulic motor for rotationally driving said extracting screw about its axis and means for producing sweeping movement of said extracting screw about a vertical axis, said hydraulic system also comprising hydraulic control means operating at relatively low pressure for producing high starting torque for rotation of said extracting screw about its axis to overcome the load moment caused by the accumulation of bulk material around said extracting screw after a period of non use, said hydraulic control means comprising a double-acting hydraulic actuator, intermittent drive means fixed for rotation with said driving shaft for converting reciprocating movement transmitted by said hydraulic actuator into intermittent angular movement imparted to said extracting screw, and hydraulic control circuit means interrupting the operation of said hydraulic actuator once normal operating torque has been reached, whereupon said extracting screw is driven by said hydraulic motor alone, said hydraulic control circuit means comprising a first line for supplying hydraulic fluid from a pump to said hydraulic actuator, a distributor valve, a pair of calibrated check valves for controlling said distributor valve, said distributor valve being disposed to connect said first line through second or third lines to the respective sides of the piston of said hydraulic actuator, a pressure relief valve being provided along each of said second and third lines and being responsive to the increase in pressure in said second or third lines to actuate said distributor valve to change its position when the pressure in said second or third lines reaches a predetermined value, and a fourth line connected to said distributor valve to drain said second or third lines.

2. The screw extracting apparatus of claim 1, wherein said intermittent drive means comprises an overrunning clutch.

3. The screw extracting apparatus of claim 1, wherein said intermittent drive means comprises a ratchet drive.

* * * * *